(12) United States Patent
Kakita et al.

(10) Patent No.: US 12,511,915 B2
(45) Date of Patent: Dec. 30, 2025

(54) IMAGE PROCESSING APPARATUS

(71) Applicant: DENSO TEN Limited, Kobe (JP)

(72) Inventors: Naoshi Kakita, Kobe (JP); Yuki Matsumoto, Kobe (JP); Takashi Kono, Kobe (JP); Shota Kinoshita, Kobe (JP); Yasutaka Nishijima, Kobe (JP)

(73) Assignee: DENSO TEN Limited, Kobe (JP)

( * ) Notice: Subject to any disclaimer, the term of this patent is extended or adjusted under 35 U.S.C. 154(b) by 205 days.

(21) Appl. No.: 18/583,990

(22) Filed: Feb. 22, 2024

(65) Prior Publication Data

US 2024/0312225 A1  Sep. 19, 2024

(30) Foreign Application Priority Data

Mar. 15, 2023 (JP) ................. 2023-040916

(51) Int. Cl.
*G06V 20/58* (2022.01)
*G06T 7/11* (2017.01)
*G06T 7/194* (2017.01)
*G06T 11/60* (2006.01)

(52) U.S. Cl.
CPC ............ *G06V 20/584* (2022.01); *G06T 7/11* (2017.01); *G06T 7/194* (2017.01); *G06T 11/60* (2013.01)

(58) Field of Classification Search
CPC ......... G06V 20/584; G06T 7/194; G06T 7/11; G06T 11/60

USPC ........................................... 348/148
See application file for complete search history.

(56) References Cited

U.S. PATENT DOCUMENTS

2021/0150232 A1* 5/2021 Su .................. G06F 18/28
2023/0401875 A1* 12/2023 Chien ............ G06V 10/56

FOREIGN PATENT DOCUMENTS

JP        2019-139801 A     8/2019

* cited by examiner

*Primary Examiner* — Sath V Perungavoor
*Assistant Examiner* — Kristin Dobbs
(74) *Attorney, Agent, or Firm* — Oliff PLC (57) ABSTRACT

An image processing apparatus includes a controller configured to: (i) perform image recognition of the camera image to identify a signal region in which a traffic light exists in the camera image; (ii) divide the signal region into a plurality of sub-regions; (iii) calculate a first representative pixel value related to a color component for each of a predetermined number of the sub-regions; (iv) identify as same color regions each of the predetermined number of the sub-regions that have more than a predetermined number of pixels with pixel values within a predetermined range of the first representative pixel value; (v) calculate a second representative pixel value related to a color component in the same color regions; and (vi) exclude the pixels having the pixel values within a predetermined range of the second representative pixel value from the signal region for subsequent determination of the light color of the traffic light.

14 Claims, 12 Drawing Sheets

IMAGE PROCESSING APPARATUS

BACKGROUND OF THE INVENTION

Field of the Invention

The invention relates to an image processing apparatus, an image processing method and a non-transitory computer-readable recording medium.

Description of the Background Art

Conventionally, a technology that detects a traffic light and a light color of the traffic light by template matching for a camera image from a vehicle has been proposed (for example, refer to the Japanese Published Unexamined Patent Application No. 2019-139801).

In this technology, a plurality of template images corresponding to respective light colors of the traffic light, such as green, yellow, and red, is generated from a large number of sample images of the traffic light captured in various environments with different light exposure, etc. For hue, saturation, and lightness values of each pixel in the template images, average values of hue, saturation, and lightness of the same pixel in the sample image group are set.

However, in the conventional technology described above, insufficient consideration has been given to excluding a background region of the traffic light in the camera image from the template matching. As a result, when using the conventional technology described above, there is a risk that background color components as color components of the background region may cause the respective light colors of the traffic light to be detected erroneously.

Specifically, for example, if the background of the traffic light is mostly a blue sky, and a template image corresponding to a green light happens to match the background region, the traffic light may be erroneously detected as being in a green lighting state although the traffic light is not in the green lighting state.

Furthermore, although the sample images are captured in various environments, it is virtually difficult to cover all environments. Thus, when using the conventional technology described above, detection accuracy may deteriorate in situations where a user encounters a real environment that is not present in the sample images.

SUMMARY OF THE INVENTION

According to one aspect of the invention, an image processing apparatus includes a controller that determines a light color of a traffic light from a camera image. The controller is configured to: (i) perform image recognition of the camera image to identify a signal region in which a traffic light exists in the camera image; (ii) divide the signal region into a plurality of sub-regions; (iii) calculate a first representative pixel value related to a color component for each of a predetermined number of the sub-regions; (iv) identify as same color regions each of the predetermined number of the sub-regions that have more than a predetermined number of pixels with pixel values within a predetermined range of the first representative pixel value; (v) calculate a second representative pixel value related to a color component in the same color regions; and (vi) exclude the pixels having the pixel values within a predetermined range of the second representative pixel value from the signal region for subsequent determination of the light color of the traffic light.

It is an object of the invention to provide an image processing apparatus, an image processing method and a non-transitory computer-readable recording medium capable of accurately identifying a background region of a traffic light and improving detection accuracy of respective light colors of the traffic light.

These and other objects, features, aspects and advantages of the invention will become more apparent from the following detailed description of the invention when taken in conjunction with the accompanying drawings.

DESCRIPTION OF THE EMBODIMENTS

An embodiment of an image processing apparatus, an image processing method, and a non-transitory computer-readable recording medium disclosed in the present application will be described in detail below with reference to the accompanying drawings. This invention is not limited to the embodiment described below.

In the following, it is assumed that an image processing apparatus 10 according to the embodiment is an in-vehicle apparatus to be mounted in a vehicle. The image processing apparatus 10 is provided to detect an object and a state of the object in a camera image by image recognition of the camera image. In this embodiment, it is assumed that the object to be detected is a traffic light 300. Furthermore, it is assumed that the state of the object to be detected is a lighting state of the traffic light 300. The lighting state refers to a green lighting state, a yellow lighting state, or a red lighting state of the traffic light 300. The lighting state may include a state in which an arrow light is turned on.

Hereinafter, the expression "prescribed" or "certain" may be replaced with "predetermined".

Figure 1:
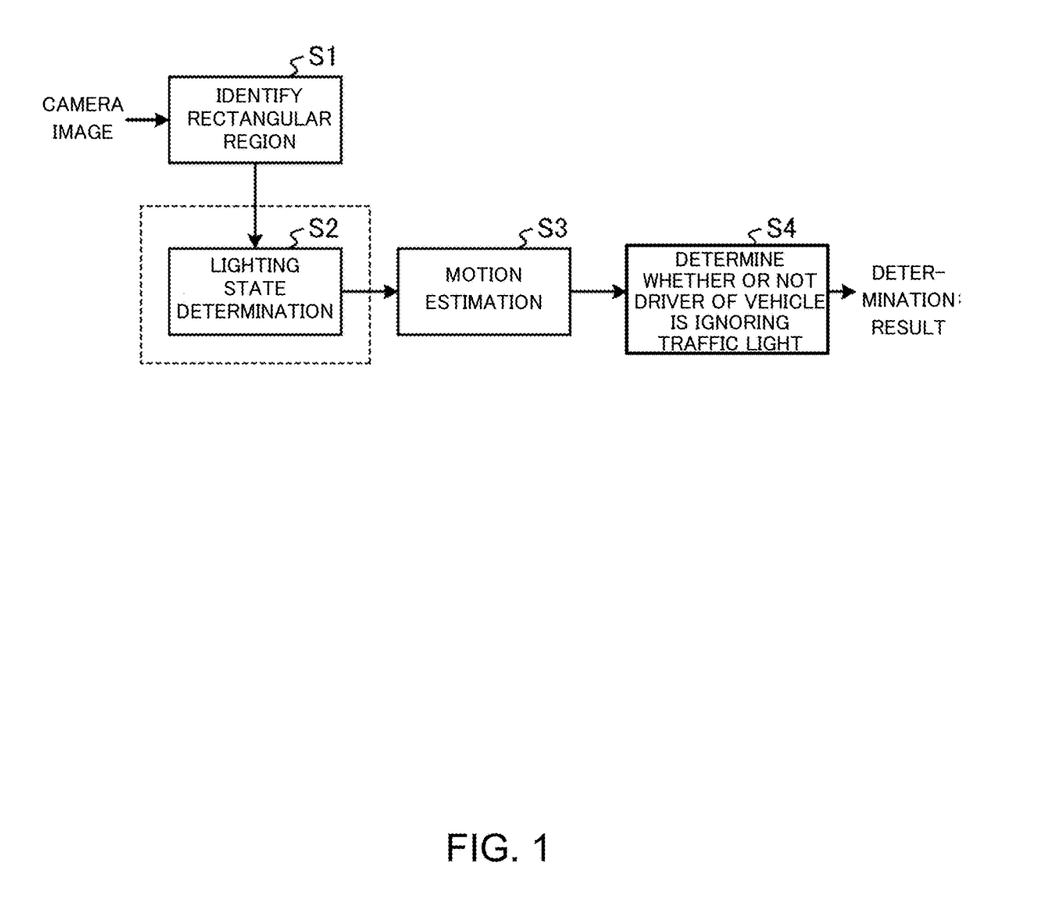
FIG. 1 is a schematic explanatory diagram (No. 1) of an image processing method according to an embodiment.
Figure 2:
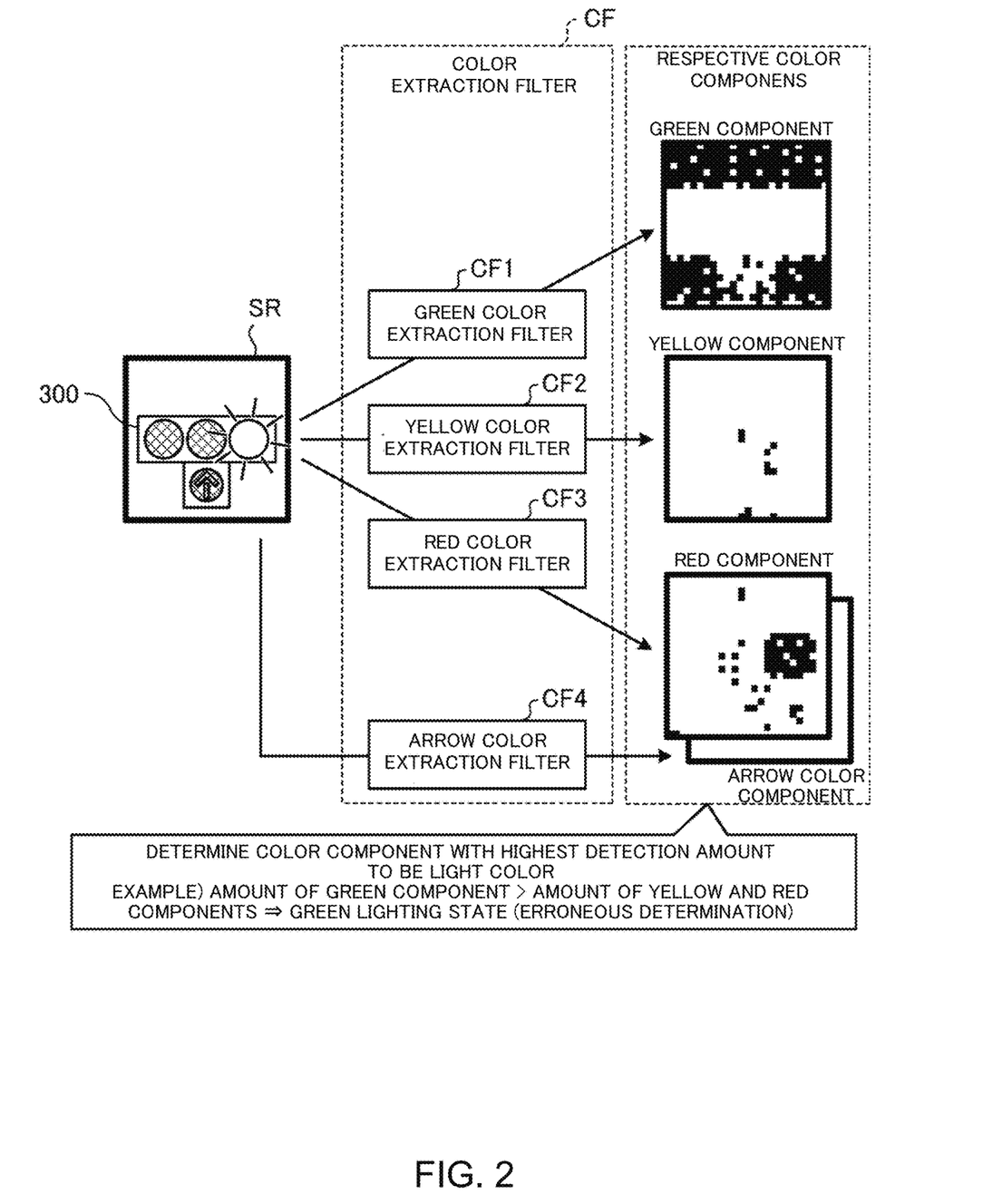
FIG. 2 is an explanatory diagram in a case where a light color is erroneously determined by applying a color extraction filter.
Figure 3:
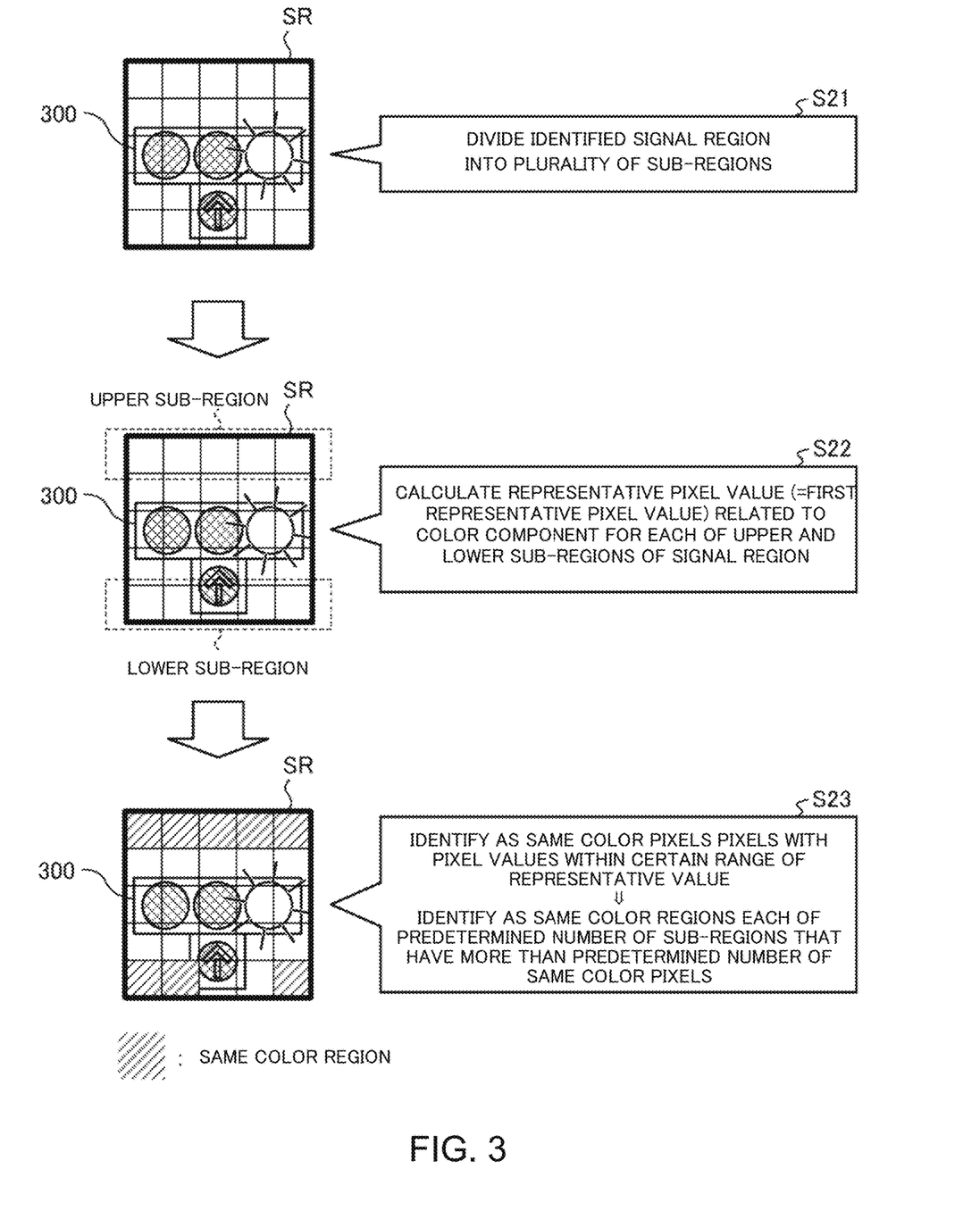
FIG. 3 is a schematic explanatory diagram (No. 2) of the image processing method according to the embodiment.
Figure 4:
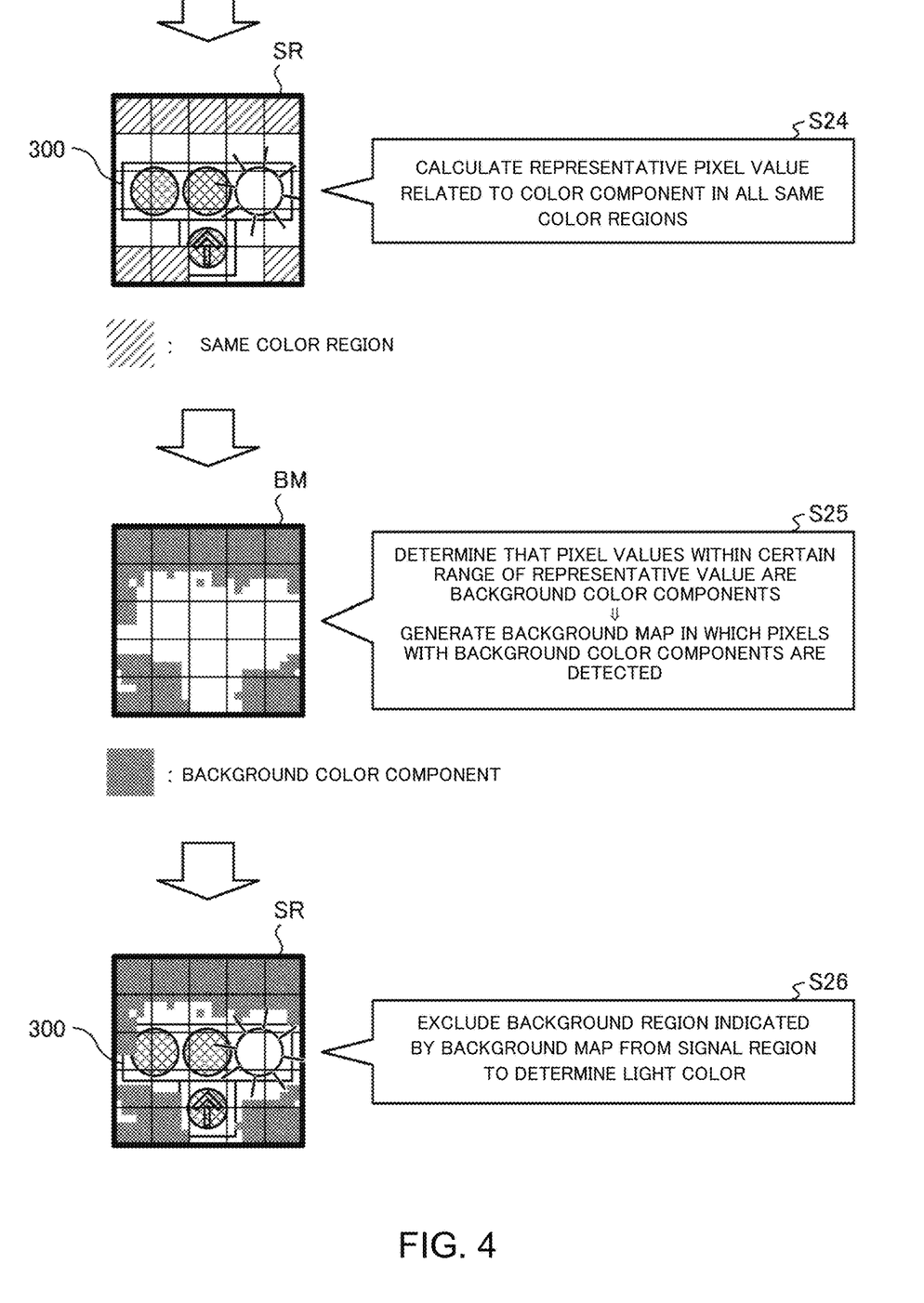
FIG. 4 is a schematic explanatory diagram (No. 3) of the image processing method according to the embodiment.

First, an outline of the image processing method according to the embodiment will be described with reference to FIG. 1 to FIG. 4. FIG. 1 is a schematic explanatory diagram (No. 1) of the image processing method according to the embodiment. FIG. 2 is an explanatory diagram in a case where a light color is erroneously determined by applying a color extraction filter CF. FIG. 3 is a schematic explanatory diagram (No. 2) of the image processing method according to the embodiment. FIG. 4 is a schematic explanatory diagram (No. 3) of the image processing method according to the embodiment.

The image processing apparatus 10 detects the lighting state of the traffic light 300 to determine whether or not a driver of the vehicle is ignoring the traffic light, for example, based on the detection result. Such information processing is executed by a controller 12 (refer to FIG. 5) included in the image processing apparatus 10.

As illustrated in FIG. 1, the controller 12 inputs the camera image and identifies a rectangular region in which the traffic light 300 exists from the image. (a step S1). In the step S1, the controller 12 identifies the rectangular region in which the traffic light 300 exists from the image using a DNN (Deep Neural Network) model, etc., learned by using a machine learning algorithm. In the following, such a rectangular region is referred to as a "signal region SR".

The signal region SR is identified as a rectangular region always having the same size (e.g., 25×25 pixels). The controller 12 identifies the signal region SR while sampling the traffic lights 300 that appear in the camera image in various sizes from the camera image so that the traffic lights 300 have almost the same size in the same-sized rectangular region.

At this time, when the traffic light 300 is vertically oriented, the controller 12 samples the traffic light 300 so that the traffic light 300 is always regarded as being horizontally oriented. That is, the controller 12 always regards the traffic light 300 as being horizontally oriented by rotating the signal region SR accordingly.

Subsequently, the controller 12 inputs the signal region SR to determine the lighting state of the traffic light 300 (a step S2). In the step S2, the controller 12 analyzes an image of the signal region SR to determine whether the traffic light 300 is in the green lighting state, the yellow lighting state, or the red lighting state. In the red lighting state, the controller 12 further determines whether or not an arrow light of the traffic light 300 is turned on.

Next, the controller 12 performs motion estimation of estimating how the traffic light 300 moves relative to a traveling vehicle by a difference between frames of the camera image (a step S3). Then, the controller 12 determines whether or not the driver of the vehicle is ignoring the traffic light based on a result of a lighting state determination in the step S2 and a result of the motion estimation in the step S3 (a step S4), and outputs the determination result.

The image processing method according to the embodiment is applied in the step S2 surrounded by a dashed rectangle in FIG. 1. In the case of determining the light color of the traffic light 300 in the step S2, there is a conventional technology in which the controller 12 extracts respective color components corresponding to respective light colors of the traffic light 300 from the signal region SR using the color extraction filter CF to determine the light color based on the extraction amount. The extraction amount is, for example, a number of pixels extracted as having the respective color components corresponding to the respective light colors of the traffic light 300 in the signal region SR.

Specifically, as illustrated in FIG. 2, the controller 12 applies a green color extraction filter CF1 to the signal region SR to detect pixels having a green component from the signal region SR. Furthermore, the controller 12 applies a yellow color extraction filter CF2 to the signal region SR to detect pixels having a yellow component from the signal region SR.

Moreover, the controller 12 applies a red color extraction filter CF3 to the signal region SR to detect pixels having a red component from the signal region SR. The controller 12 applies an arrow color extraction filter CF4 to the signal region SR to detect pixels having an arrow color component from the signal region SR.

The controller 12 first compares detection amount of the pixels having the green, yellow, and red components, among the detected pixels, to determine the color component with the highest detection amount to be the light color, for example, as illustrated in FIG. 2.

However, in the conventional technology, insufficient consideration has been given to excluding a background region of the traffic light 300 from a light color determination. Thus, in the conventional technology, a background color component as a color component of the background region may cause the light color of the traffic light 300 to be erroneously determined.

Specifically, in an example of FIG. 2, although the traffic light is in the red lighting state, it is assumed that the background of the traffic light 300 is mostly a blue sky. Then, in the conventional technology that does not consider the background region, it may happen that the extraction amount of each of the respective color components extracted by the respective color extraction filters CF has a relationship of "amount of green component>amount of yellow and red components", for example.

As a result, although the traffic light 300 is in the red lighting state, the controller 12 may erroneously determine that the traffic light 300 is in the green lighting state, as illustrated in FIG. 2.

Therefore, in the image processing method according to the embodiment, when determining the light color of the traffic light 300 in the step S2, the pixels having the color component of the background is detected from the signal region SR. Then, after excluding the background region indicated by this background color component from the signal region SR, the light color of the traffic light 300 is determined.

Specifically, as illustrated in FIG. 3, in the image processing method according to the embodiment, the controller 12 divides the identified signal region SR into a plurality of sub-regions (a step S21). In this embodiment, the controller 12 divides the signal region SR into 25 (=5×5) sub-regions. That is, one sub-region is equal to 5×5 pixels. However, this is merely one example, and a number of divisions of the signal region SR and a size of the sub-region are not limited thereto.

Subsequently, the controller 12 calculates a representative pixel value (that corresponds to one example of a "first representative pixel value") related to the color component for each of upper and lower sub-regions of the signal region SR (a step S22). Since, as described above, the traffic light 300 is always present in the signal region SR as a horizontal traffic light, the upper and lower sub-regions of the signal region SR are predetermined as regions in which the background is likely to be captured. As a result, the controller 12 narrows the regions in which the background appears in the camera image to the upper and lower sub-regions of the signal region SR, for example.

In this embodiment, the controller 12 uses a color space value in a YUV format (hereinafter, referred to as a "YUV value", accordingly) as the pixel value related to the color component in the step S22. The YUV value is merely one example of the pixel value related to the color component. Therefore, in other examples, the pixel value related to the color component may be, for example, a color space value in an HSV format, and the like. In this embodiment, the controller 12 calculates an average value of the YUV values as a representative value of the YUV values in the step S22.

Subsequently, the controller 12 identifies as same color pixels the pixels with the pixel values within a certain range of the representative value calculated in the step S22. The controller 12 identifies as same color regions each of the predetermined number of the sub-regions that have more than a predetermined number of the same color pixels (a step S23).

Next, as illustrated in FIG. 4, the controller 12 calculates a representative pixel value (that corresponds to one example of a "second representative pixel value") related to the color component in all the same color regions (a step S24). In this embodiment, the controller 12 uses the YUV value as the pixel value related to the color component in all the same color regions in the step S24, as in the step S22. The controller 12 calculates the average value of the YUV values as the representative value of the YUV values in the step S24.

The image processing apparatus 10 determines the light color and the background color of the traffic light 300 by using the YUV values.

The controller 12 determines that the pixel values within the certain range of the representative value calculated in the step S24 are the background color components. The controller 12 generates a background map BM in which the pixels having the background color components are detected (a step S25). A specific example of the background map BM will be described later with reference to FIG. 12.

The controller 12 excludes the background region indicated by the background map BM from the signal region SR to determine the light color (a step S26). As a result, in a case where the background of the traffic light 300 in the signal region SR is mostly a blue sky, this part of a blue sky is suppressed from being detected as the pixels having the green component in the green lighting state of the traffic light 300.

The same effect is expected when the background is uniform and has a color component similar to each of the respective light colors of the traffic light 300, such as when the background of the traffic light 300 in the signal region SR is mostly a sunset sky or trees.

In this embodiment, it is assumed that the signal region SR is 25×25 pixels, which has an advantage of reducing an image processing load but does not provide high resolution as an image. Thus, noise components, such as so-called overshoot components, in image processing tend to be generated to the traffic light 300 sampled in the signal region SR at a boundary with the background. If the noise components remain in the light color determination as other regions than the background region, there is a risk of causing erroneous determination.

Therefore, in this embodiment, the controller 12 further performs a background region extension process to extend the background region indicated by the background map BM by a predetermined number of pixels. The controller 12 excludes the background region that has been extended by this extension process from the signal region SR. Thus, the controller 12 reduces a risk of erroneous determination due to the noise components, such as the overshoot components, remained in the light color determination. Details of the background region extension process will be described with reference to FIG. 13 and FIG. 14.

As described with reference to FIG. 3 and FIG. 4, in the image processing method according to the embodiment, when the controller 12 determines the light color of the traffic light 300 in the step S2, the controller 12 calculates the average value of the YUV values for each of the predetermined sub-regions of the signal region SR as the first representative pixel value. The controller 12 identifies as the same color regions each of the predetermined number of the sub-regions that have more than the predetermined number of the pixels with the pixel values within a predetermined range of the first representative pixel value. The controller 12 calculates the average value of the YUV values in the same color regions as the second representative pixel value and excludes the pixels having the pixel values within a predetermined range of the second representative pixel value from the signal region SR for subsequent determination of the light color of the traffic light 300.

As a result, according to the image processing method according to the embodiment, it is possible to accurately identify the background region of the traffic light 300, and improve detection accuracy of the light color of the traffic light 300. In the image processing method according to the embodiment, since the controller 12 performs the image processing to determine the light color of the traffic light 300 without relying on template matching based on sample images, it is possible to deal with every real environment when the traffic light 300 is turned on.

Hereinafter, a configuration example of the image processing apparatus 10 using the image processing method according to the embodiment described above will be more specifically described.

Figure 5:
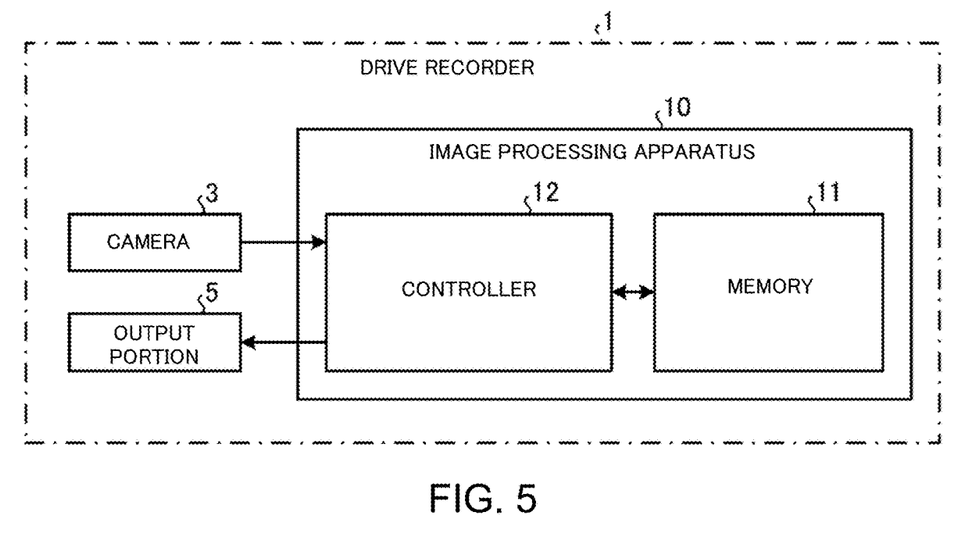
FIG. 5 illustrates a configuration example of an image processing apparatus according to the embodiment.

FIG. 5 illustrates the configuration example of the image processing apparatus 10 according to the embodiment. As illustrated in FIG. 5, the image processing apparatus 10 includes a memory 11 and the controller 12. A camera 3 and an output portion 5 are connected to the image processing apparatus 10.

The camera 3 is mounted in the vehicle and provided to capture an image in front of the vehicle. The camera 3 may be a 360-degree camera capable of capturing images not only in front of the vehicle but also all around the vehicle.

The output portion 5 is an output device that presents output information from the image processing apparatus 10. The output portion 5 is implemented by a display, a speaker, and the like.

The image processing apparatus 10 is a computer to be mounted in the vehicle. The image processing apparatus 10 performs at least the information processing of the steps S1 to S4 described using FIG. 1 and the steps S21 to S26 described using FIG. 3 and FIG. 4.

The memory 11 is implemented by a storage device, such as a RAM (Random Access Memory) or a flash memory. The memory 11 stores a computer program according to the embodiment executed by the controller 12. Furthermore, the memory 11 stores various information that is used in the information processing executed by the controller 12.

The memory 11 stores, for example, an AI (Artificial Intelligence) model for the image recognition. The memory 11 stores setting information of the color extraction filter CF, various calculation values calculated in the steps S21 to S26, the background map BM, and the like.

The controller 12 corresponds to a processor. The controller 12 is implemented by a CPU (Central Processing Unit), an MPU (Micro Processing Unit), a GPU (Graphics Processing Unit), or the like. The controller 12 reads and executes a computer program according to the embodiment stored in the memory 11 using the RAM as a work area. The controller 12 is also implemented by an integrated circuit, such as an ASIC (Application Specific Integrated Circuit) or a FPGA (Field Programmable Gate Array).

Figure 7:
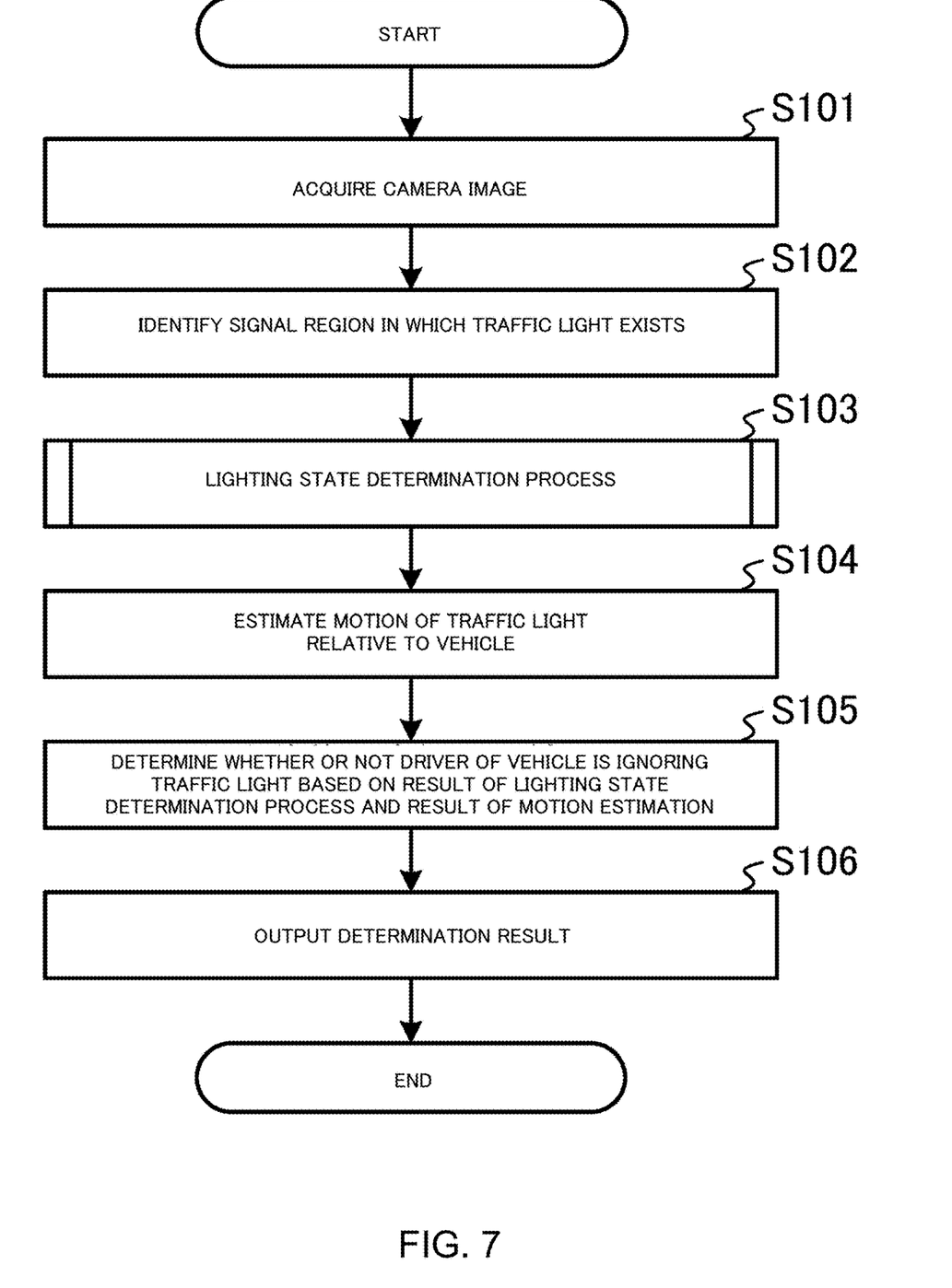
FIG. 7 is a flowchart (No. 1) illustrating a processing procedure executed by the image processing apparatus according to the embodiment.
Figure 8:
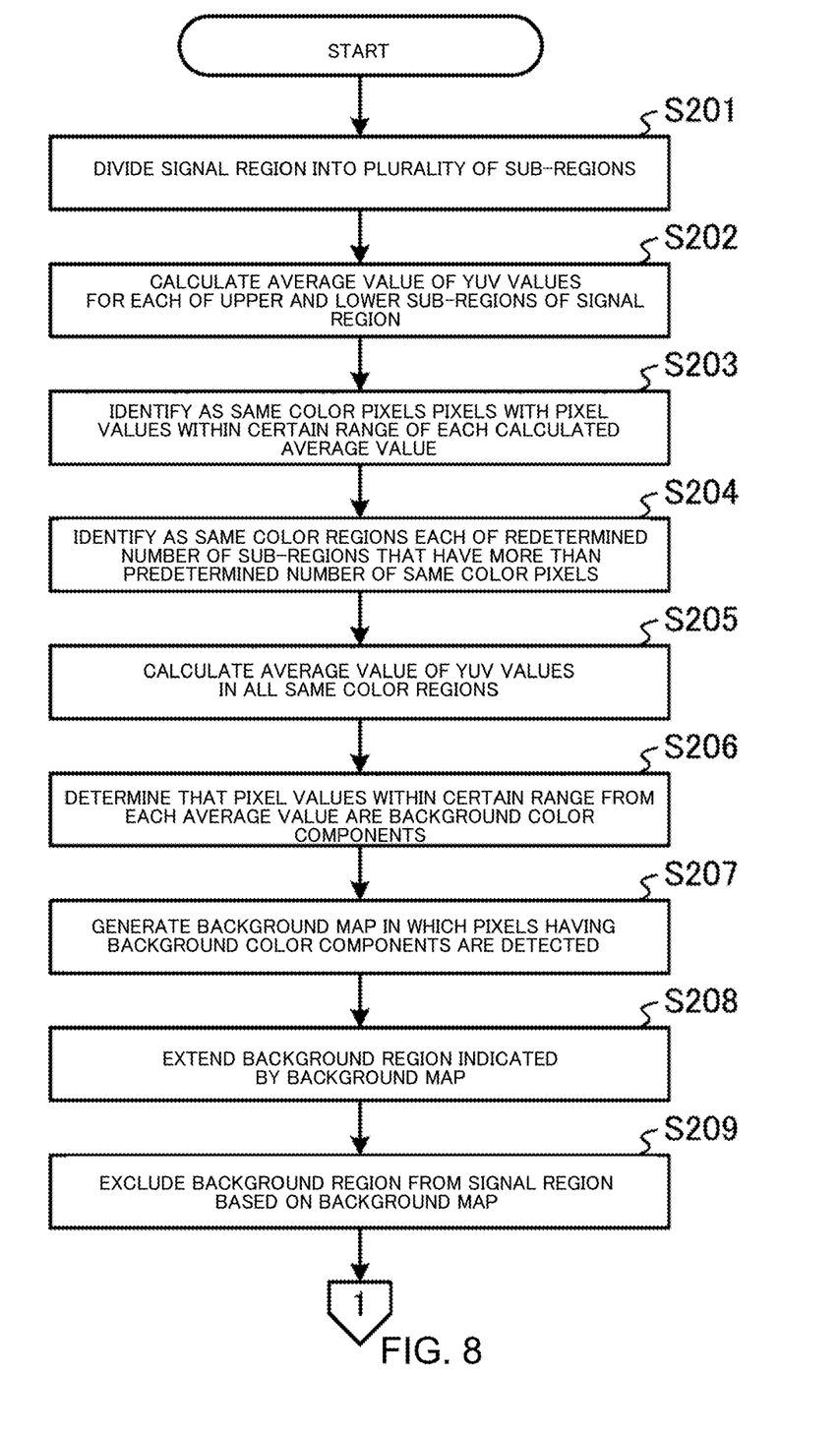
FIG. 8 is a flowchart (No. 2) illustrating the processing procedure executed by the image processing apparatus according to the embodiment.
Figure 9:
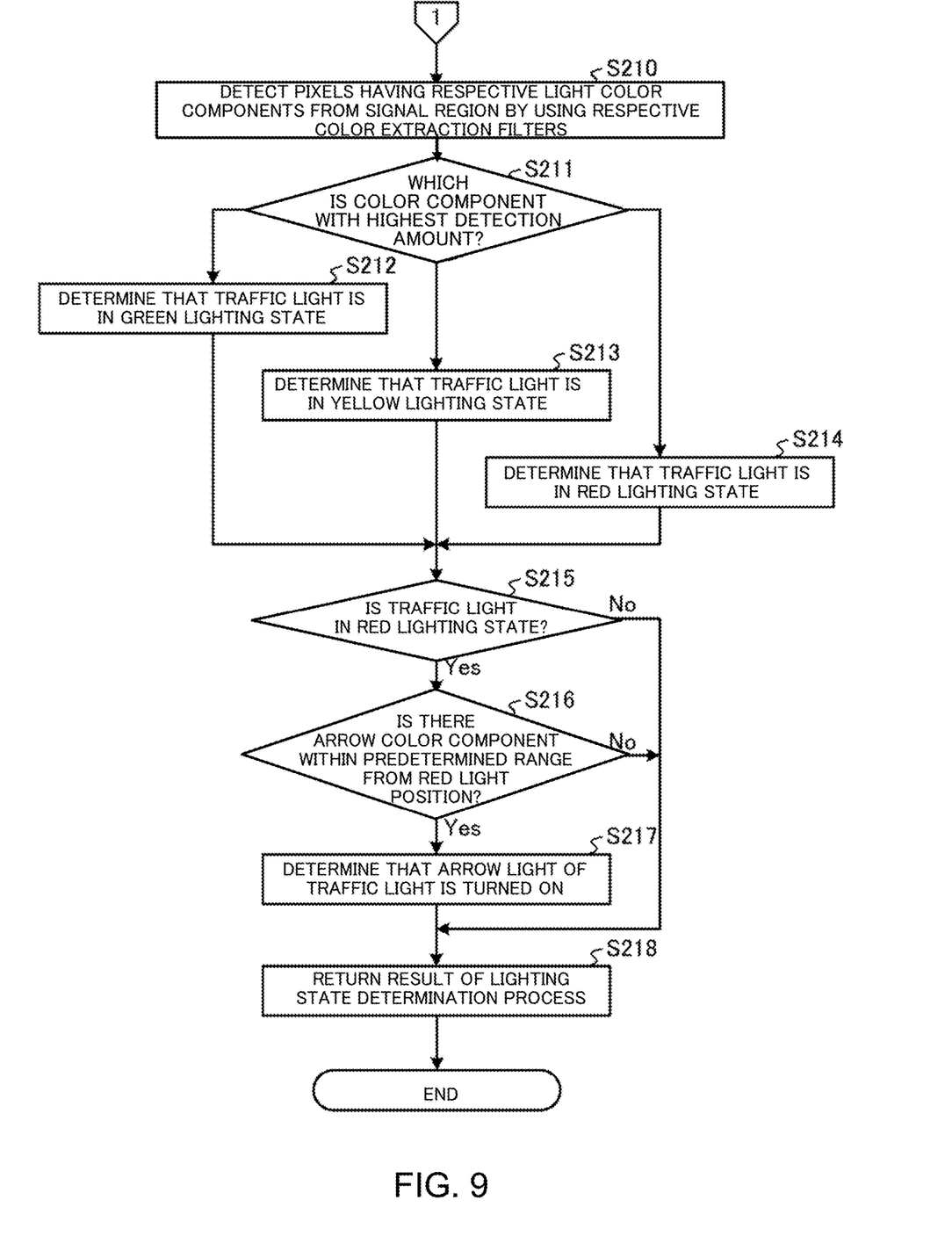
FIG. 9 is a flowchart (No. 3) illustrating the processing procedure executed by the image processing apparatus according to the embodiment.

The controller 12 performs the information processing according to the processing procedure illustrated in each flowchart of FIG. 7 to FIG. 9. An explanation with reference to FIG. 7 to FIG. 9 will be described later.

As illustrated in FIG. 5, the camera 3, the output portion 5 and the image processing apparatus 10 are implemented as a drive recorder 1. In this case, the camera 3 is implemented by a camera unit to be mounted in the drive recorder 1. The output portion 5 is implemented by a display and a speaker to be mounted in the drive recorder 1. The image processing apparatus 10 is implemented by a microcomputer to be mounted in the drive recorder 1.

Figure 6:
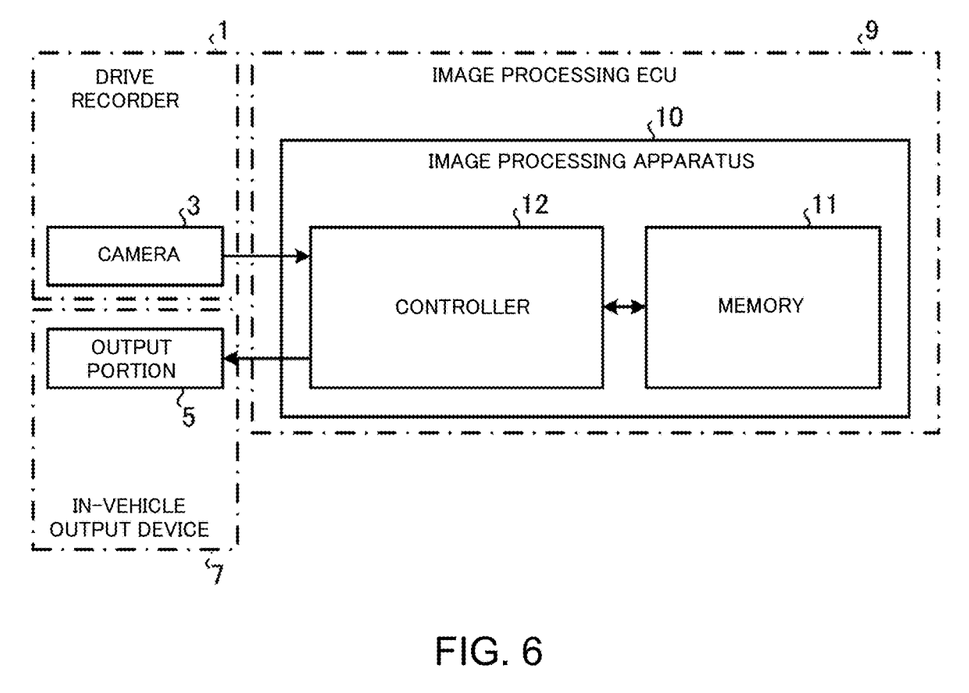
FIG. 6 illustrates a configuration example of an image processing apparatus according to a modification example.

The configuration example illustrated in FIG. 5 is one example, and besides this, modification examples will be given. FIG. 6 illustrates a configuration example of an image processing apparatus 10 according to a modification example. As illustrated in FIG. 6, the image processing apparatus 10 is implemented as an image processing ECU (Electronic Control Unit) 9. In this case, a camera 3 is, for example, implemented by a camera unit to be mounted in a drive recorder 1. The camera 3 may be implemented by an in-vehicle camera unit other than the drive recorder 1. An output portion 5 is implemented by an in-vehicle display or an in-vehicle speaker as an in-vehicle output device 7 to be mounted in a vehicle.

In an example of FIG. 6, the camera 3 and the output portion 5 are connected to the image processing apparatus 10 via an in-vehicle network, such as a CAN (Controller Area Network). The camera 3 and the output portion 5 may be connected to the image processing apparatus 10 via a Bluetooth (registered trademark), a Wi-Fi (registered trademark), a UWB (Ultra-Wide Band), or the like, by using a wireless network.

Next, a processing procedure of the information processing executed by the controller 12 of the image processing apparatus 10 will be described with reference to FIG. 7 to FIG. 9. FIG. 7 is a flowchart (No. 1) illustrating the processing procedure executed by the image processing apparatus 10 according to the embodiment. FIG. 8 is a flowchart (No. 2) illustrating the processing procedure executed by the image processing apparatus 10 according to the embodiment. FIG. 9 is a flowchart (No. 3) illustrating the processing procedure executed by the image processing apparatus 10 according to the embodiment.

In order to determine whether or not the driver of the vehicle is ignoring the traffic light as illustrated in FIG. 1, the controller 12 acquires the camera image from the camera 3 as illustrated in FIG. 7 (a step S101). Subsequently, the controller 12 identifies the signal region SR in which the traffic light 300 exists from the acquired camera image (a step S102).

In this embodiment, the controller 12 identifies the signal region SR as a rectangular region with 25×25 pixels. At this time, the controller 12 rotates the signal region SR accordingly so that the traffic light 300 is always regarded as being horizontally oriented.

Subsequently, the controller 12 performs a "lighting state determination process" to determine the lighting state of the traffic light 300 based on the identified signal region SR (a step S103).

In this "lighting state determination process", as illustrated in FIG. 8, the controller 12 divides the signal region SR into the plurality of the sub-regions (a step S201). The controller 12 divides the signal region SR into the plurality of the sub-regions in a predetermined size. In this embodiment, the controller 12 divides the signal region SR into the plurality of the sub-regions each having 5×5 pixels, as described above.

The controller 12 calculates the average value of the YUV values (corresponding to one example of the "first representative pixel value") for each of the upper and lower sub-regions of the signal region SR (a step S202). Since, in this embodiment, the traffic light 300 is always regarded as being horizontally oriented, the controller 12 sets in advance the upper and lower sub-regions as regions in which the background is captured. As a result, the controller 12 uniformly treats the image processing for the signal region SR as the image processing for the horizontal traffic light 300, regardless of whether the actual traffic light 300 is horizontally or vertically oriented. Furthermore, the controller 12 narrows the regions in which the background is captured to the upper and lower sub-regions.

The controller 12 identifies as the same color pixels the pixels with the pixel values within the certain range of each calculated average value (a step S203). After that, the controller 12 identifies as the same color regions each of the predetermined number of the sub-regions that have more than the predetermined number of the same color pixels (a step S204).

Subsequently, the controller 12 calculates the average value of the YUV values (corresponding to one example of the "second representative pixel value") in all the same color regions (a step S205). The controller 12 determines that the pixel values within the certain range of each calculated average value are the background color components (a step S206).

The controller 12 generates the background map BM in which the pixels having the background color components are detected (a step S207). Here, in order to clarify the explanation, the processing procedures of the steps S202 to S207 will be described with reference to FIG. 10 to FIG. 12.

Figure 10:
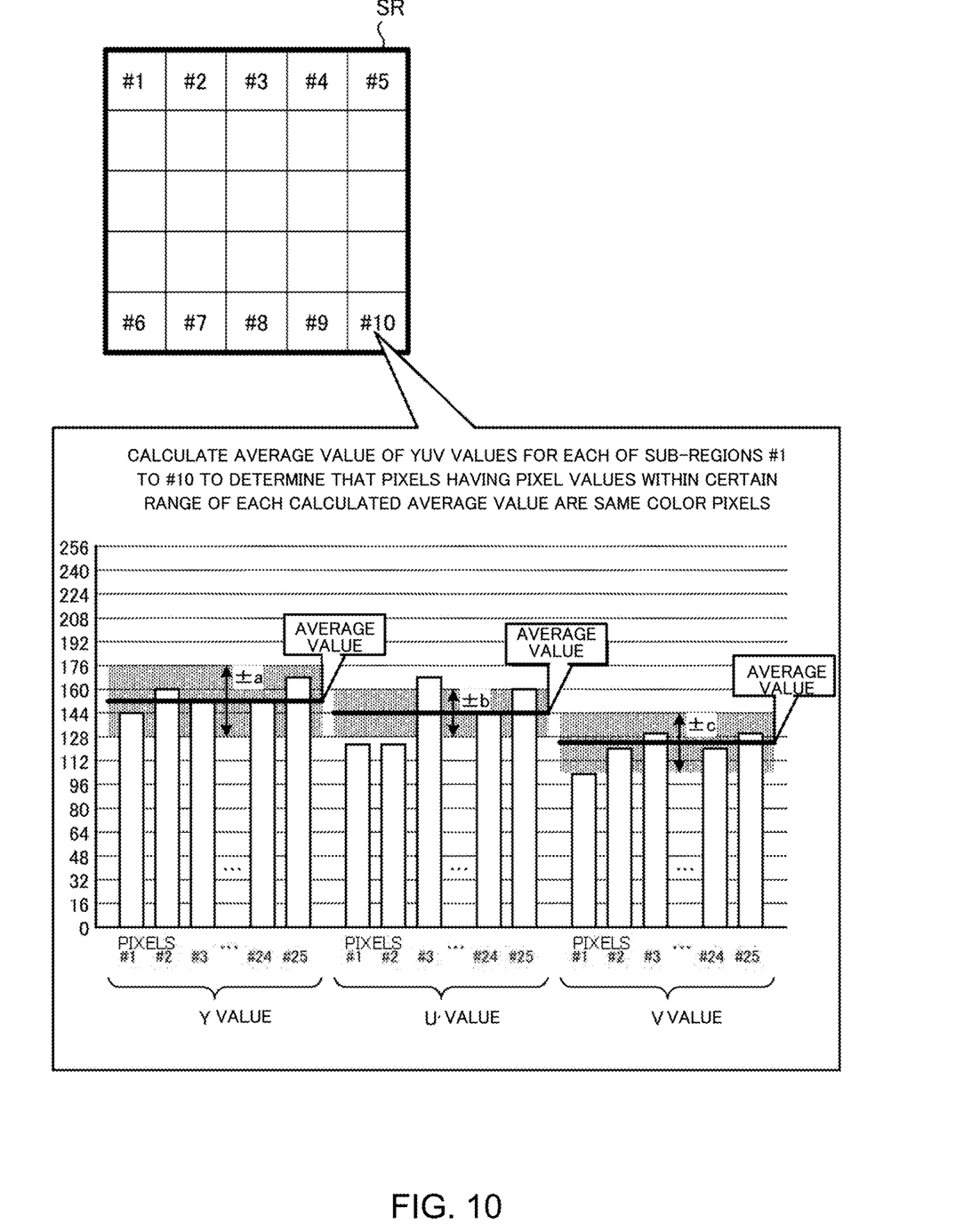
FIG. 10 is an explanatory diagram of steps S202 to S203.
Figure 11:
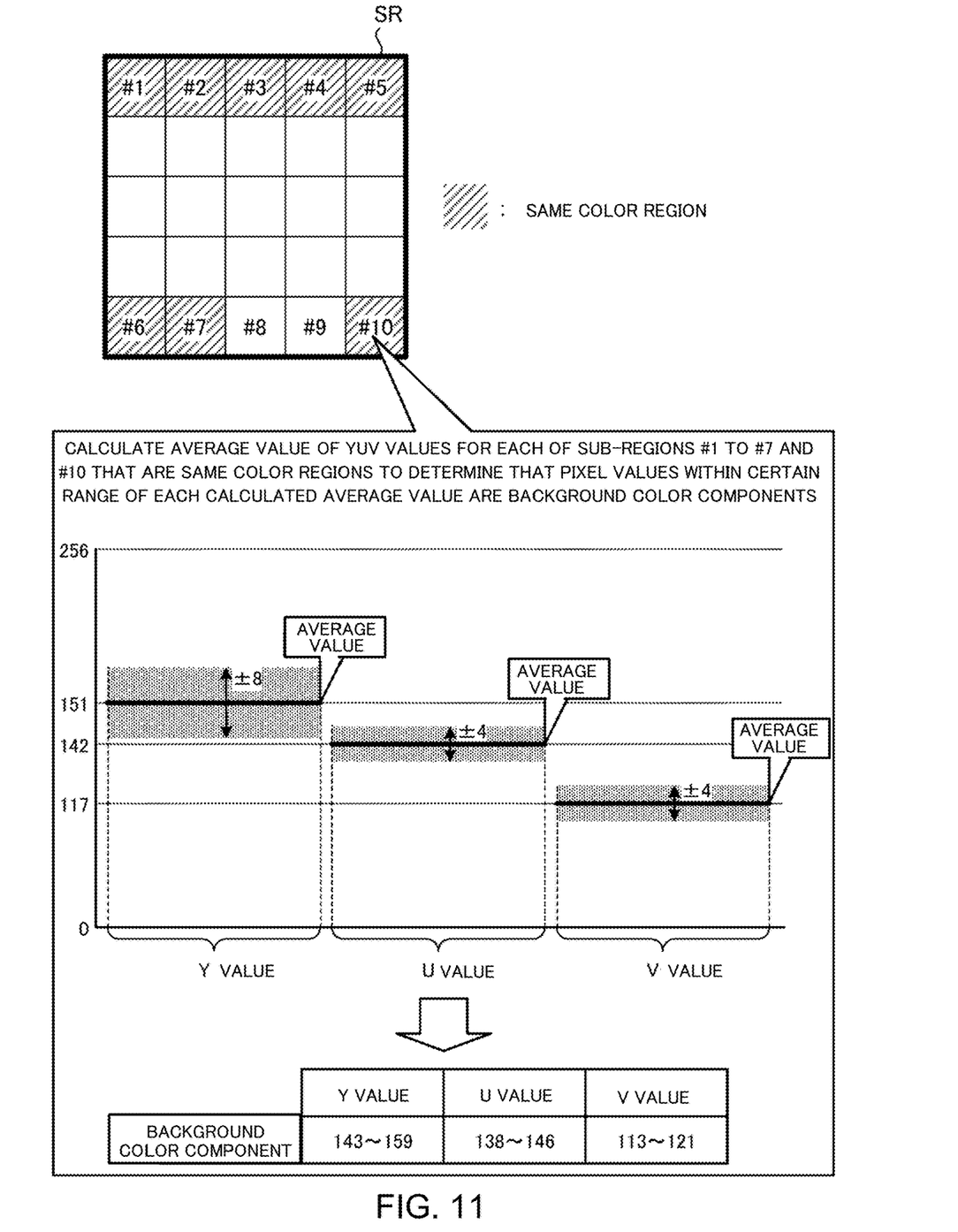
FIG. 11 is an explanatory diagram of steps S204 to S206.
Figure 12:
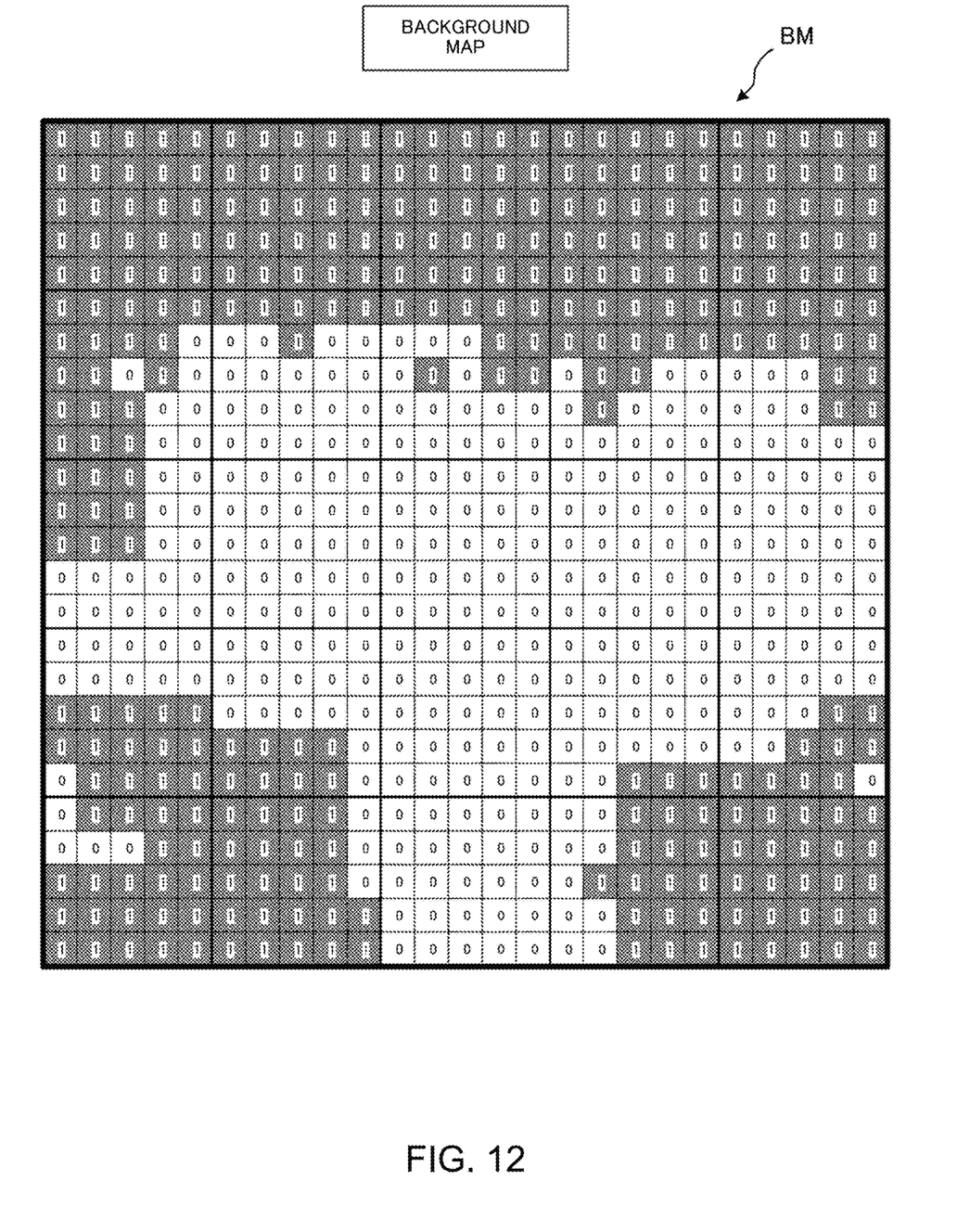
FIG. 12 illustrates one example of a background map.

FIG. 10 is an explanatory diagram of the steps S202 to S203. FIG. 11 is an explanatory diagram of the steps S204 to S206. FIG. 12 illustrates one example of the background map BM.

As illustrated in FIG. 10, in the steps 202 to S203, the controller 12 processes sub-regions #1 to #10 that are the upper and lower sub-regions of the signal region SR. The controller 12 calculates the average value of the YUV values for each of the sub-regions #1 to #10 to determine that the pixels having the pixel values within the certain range of each calculated average value are the same color pixels.

In an example of FIG. 10, the controller 12 calculates each average value of Y values, U values and V values of 25 pixels #1 to #25 in the sub-region #10. The controller 12 determines that the pixels the having the pixel values in which, for example, the Y values fall within +a from the average value of the Y values, the U values fall within +b from the average value of the U values, and the V values fall within +c from the average value of the V values are the same color pixels. In the example of FIG. 10, at least the pixels #24 and #25 are determined to be the same color pixels.

When the sub-regions with the predetermined number or more of the pixels of the same color are the sub-regions #1 to #7 and #10, the controller 12 determines that these sub-regions #1 to #7 and #10 are the same color regions, as illustrated in FIG. 11.

The controller 12 calculates the average value of the YUV values for each of the sub-regions #1 to #7 and #10 that are the same color regions to determine that the pixel values within the certain range of each calculated average value are the background color components. In an example of FIG. 11, the controller 12 determines that the pixel values in which, for example, the Y values fall within ±8 from the average value of the Y values "151", the U values fall within ±4 from the average value of the U values "142", and the V values fall within ±4 from the average value of the V values "117" are the background color components. That is, the controller 12 determines that the pixel values in which the Y values fall within "143 to 159", the U values fall within "138 to 146", and the V values fall within "113 to 121" are the background color components.

Then, the controller 12 generates the background map BM in which the pixels having the background color components are detected from the signal region SR. As illustrated in FIG. 12, the background map BP is generated as map information for 25×25 pixels as in the signal region SR. For example, a flag value "1" is set to a pixel position of the pixels having the background color components, and a flag value "0" is set to a pixel position of the pixels without background color components, respectively. Since an example of FIG. 12 is merely one example, the background color components are not limited to the values to be set to the pixel positions. The values to be set may be truth-values that indicate whether or not the pixels at least correspond to the background color components.

Referring back to FIG. 8, after having generated the background map BM in the step S207, the controller 12 extends the background region indicated by the background map BM (a step S208). Here, the background region extension process will be described with reference to FIG. 13 to FIG. 14.

Figure 13:
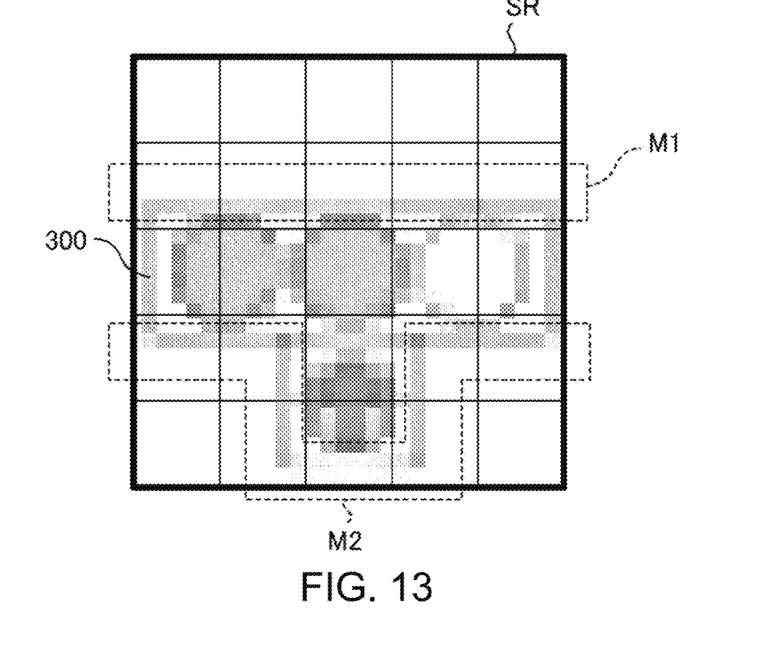
FIG. 13 is an explanatory diagram (No. 1) of a background region extension process.
Figure 14:
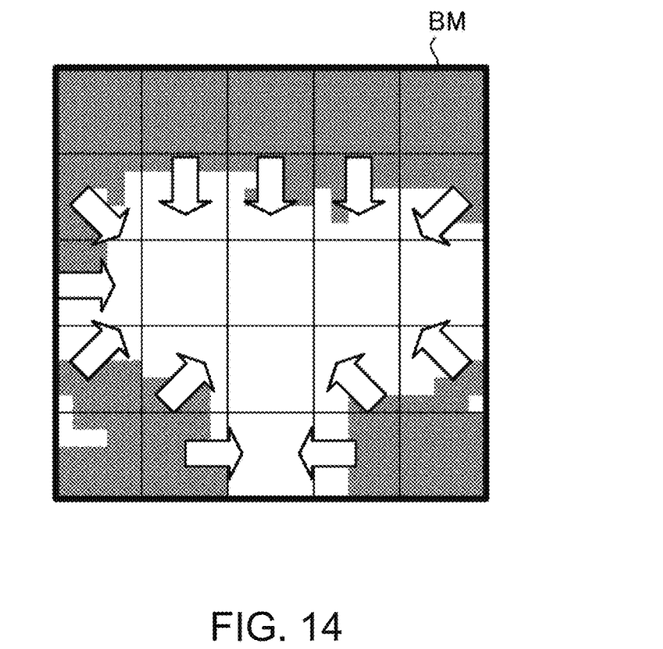
FIG. 14 is an explanatory diagram (No. 2) of the background region extension process.

FIG. 13 is an explanatory diagram (No. 1) of the background region extension process. FIG. 14 is an explanatory diagram (No. 2) of the background region extension process.

In this embodiment, it is assumed that the signal region SR is 25×25 pixels, which has an advantage of reducing the image processing load but does not provide high resolution as an image, as illustrated in FIG. 13. Thus, as illustrated in M1 and M2 parts of FIG. 13, noise components, such as so-called overshoot components, in the image processing tend to be generated to the traffic light 300 sampled in the signal region SR at the boundary with the background. As illustrated in FIG. 13, the noise components blur the boundary between the traffic light 300 and the background in the signal region SR. If the noise components remain in the light color determination as other regions than the background region, there is a risk of causing erroneous determination.

Therefore, as illustrated in FIG. 14, the controller 12 performs the background region extension process to extend the background region indicated by the background map BM by the predetermined number of the pixels. The predetermined number of the pixels refers to, for example, two pixels. For example, the controller 12 performs a known extension process of pixels in the image processing to extend the background region indicated by the background map BM by two pixels. Then, the controller 12 excludes the background region that has been extended by this extension process from the signal region SR Thus, the controller 12 reduces a risk of erroneous determination due to the noise components, such as overshoot components, remained in the light color determination.

Referring back to FIG. 8, the controller 12 excludes the background region from the signal region SR based on the background map BM extended in the step S208 (a step S209).

Subsequently, as illustrated in FIG. 9, the controller 12 applies the respective color extraction filters CF to the signal region SR from which the background region is excluded to detect the pixels having the respective light color components from the signal region SR by using the respective color extraction filters CF (a step S210).

The controller 12 determines the color components with the highest detection amount in the pixels having the green, yellow, and red components among the detected pixels having the respective light color components (a step S211). Here, when the color component with the highest detection amount is the pixels having the green component (green in the step S211), the controller 12 determines that the traffic light 300 is in the green lighting state (a step S212).

When the color component with the highest detection amount is the pixels having the yellow component (yellow in the step S211), the controller 12 determines that the traffic light 300 is in the yellow lighting state (a step S213). When the color component with the highest detection amount is the pixels having the red component (red in the step S211), the controller 12 determines that the traffic light 300 is in the red lighting state (a step S214).

Subsequently, the controller 12 determines whether or not the traffic light 300 is in the red lighting state (a step S215). When the traffic light 300 is in the red lighting state (Yes in the step S215), the controller 12 determines whether or not there are the pixels having the respective color components used for the arrow light within a predetermined range from a red light position (a step S216). The predetermined range from the red light position is, for example, but not limited to, the predetermined range from the center of gravity of a red component region downwards in which one or more arrow lights are estimated to exist when the traffic light 300 includes the arrow light.

When there is the arrow color component used for the arrow light (Yes in the step S216), the controller 12 determines that the arrow light of the traffic light 300 is turned on (a step S217).

When the traffic light 300 is not in the red lighting state in the step S215 (No in the step S215), or there is no arrow color component used for the arrow light in the step S216 (No in the step S216), the controller 12 moves the process to a step S218.

Then, the controller 12 returns a result of the lighting state determination process (the step S218), and ends the lighting state determination process.

Referring back to FIG. 7, when the controller 12 ends the step S103, the controller 12 estimates a motion of the traffic light 300 relative to the vehicle (a step S104). The controller 12, as described above, estimates how the traffic light 300 moves relative to the traveling vehicle by the difference between the frames of the camera image, for example.

Subsequently, the controller 12 determines whether or not the driver of the vehicle is ignoring the traffic light based on the result of the lighting state determination process in the step S103 and the result of the motion estimation in the step S104 (a step S105).

In the step S105, although the traffic light 300 that presents priority of traffic in a traveling direction of the vehicle is in the red lighting state, when the vehicle continues to travel for a predetermined time or longer and at a predetermined speed or faster, the controller 12 determines that the driver of the vehicle has ignored the traffic light.

Then, the controller 12 outputs the determination result in the step S105 to the output portion 5 (a step S106), and ends the process.

Although illustration is omitted, the controller 12 may output the determination result to the output portion 5 based on stability of the determination result between the frames of the camera image. In one example, when the stability is considered to be high, such as the same consecutive determination results between the frames, the controller 12 may output the determination result to the output portion 5. As a result, it is possible to output the stable determination result that is hardly affected by a disturbance, and the like.

As described above, the image processing apparatus 10 according to the embodiment includes the controller 12 that determines the light color of the traffic light 300 from the camera image. The controller 12 calculates the average value of the YUV values for each of the predetermined sub-regions in the signal region SR as the first representative pixel value. The controller 12 identifies as the same color regions each of the predetermined number of the sub-regions that have more than the predetermined number of the pixels with the pixel values within the predetermined range of the first representative pixel value. The controller 12 calculates the average value of the YUV values in the same color regions as the second representative pixel value, and excludes the pixels having the pixel values within the predetermined range of the second representative pixel value from the signal region SR for subsequent determination of the light color of the traffic light 300. As a result, it is possible to accurately identify the background region of the traffic light 300, and improve the detection accuracy of the light color of the traffic light 300. Since the controller 12 performs the image processing to determine the light color of the traffic light 300 without relying on the template matching based on the sample images, it is possible to deal with every real environment when the traffic light 300 is turned on.

In the above embodiment, although the controller 12 always regards the traffic light 300 as being horizontally oriented by rotating the signal region SR accordingly, the controller 12 does not always have to rotate the signal region SR. In this case, when the traffic light 300 is vertically oriented in the signal region SR, the controller 12 calculates the first representative pixel value for each of predetermined left and right sub-regions, not for each of the upper and lower sub-regions of the signal region SR. As a result, even when the image processing to be executed does not include an algorithm that causes the signal region SR to be rotated, the controller 12 identifies the background region accordingly.

Furthermore, in the embodiment described above, although an example in which the signal region SR is a rectangular region with 25×25 pixels has been described, this is merely one example. The size and shape of the signal region SR are not limited thereto. The number of the pixels that constitute the signal region SR may be appropriately changed depending on processing capability, etc. of the image processing apparatus 10. The signal region SR does not have to be a square as the rectangular region. The size and shape of the sub-region may be appropriately changed depending on the signal region SR.

In the embodiment described above, although the lighting state determination and motion estimation of the traffic light 300 and the determination of whether or not the driver of the vehicle is ignoring the traffic light are performed based on the image recognition, sensor data of various sensors mounted in the vehicle may be naturally combined with the image recognition. For example, a behavior of the vehicle may be estimated by using a sensor value of a steering sensor or an acceleration sensor. An own vehicle speed may be acquired by using a sensor value of a speed sensor.

It is possible for a person skilled in the art to easily come up with more effects and modifications. Thus, a broader modification of this invention is not limited to specific description and typical embodiments described and expressed above. Therefore, various modifications are possible without departing from the general spirit and scope of the invention defined by claims attached and equivalents thereof.

While the invention has been shown and described in detail, the foregoing description is in all aspects illustrative and not restrictive. It is therefore understood that numerous other modifications and variations can be devised without departing from the scope of the invention.

What is claimed is:

1. An image processing apparatus comprising a controller that determines a light color of a traffic light from a camera image, the controller configured to:
   (i) perform image recognition of the camera image to identify a signal region in which a traffic light exists in the camera image;
   (ii) divide the signal region into a plurality of sub-regions;
   (iii) calculate a first representative pixel value related to a color component for each of a predetermined number of the sub-regions;
   (iv) identify as same color regions each of the predetermined number of the sub-regions that have more than a predetermined number of pixels with pixel values within a predetermined range of the first representative pixel value;
   (v) calculate a second representative pixel value related to a color component in the same color regions; and
   (vi) exclude the pixels having pixel values within a predetermined range of the second representative pixel value from the signal region for subsequent determination of the light color of the traffic light.

2. The image processing apparatus according to claim 1, wherein
   (a) the pixel values within the predetermined range of the second representative pixel value are determined to be background color components, (b) a background region in which the pixels having the background color components are detected is identified in the signal region, and (c) the background region that has been identified is excluded from the signal region.

3. The image processing apparatus according to claim 1, wherein
   the predetermined number of the sub-regions for which the first representative pixel value is calculated are sub-regions of the signal region in which a background of the traffic light is likely to be captured.

4. The image processing apparatus according to claim 3, wherein
   the first representative pixel value for each of upper and lower sub-regions of the signal region is calculated after rotating the signal region that has been identified so that the traffic light is regarded as being horizontally oriented.

5. The image processing apparatus according to claim 3, wherein
   the first representative pixel value for each of left and right sub-regions of the signal region is calculated when the traffic light is vertically oriented.

6. The image processing apparatus according to claim 1, wherein
an average value of YUV values of each pixel for each of the sub-regions is calculated as the first representative pixel value and an average value of YUV values of each pixel in the same color regions is calculated as the second representative pixel value.

7. An image processing method executed by an image processing apparatus that determines a light color of a traffic light from a camera image, the method comprising the steps of:
(a) performing image recognition of the camera image to identify a signal region in which the traffic light exists in the camera image;
(b) dividing the signal region into a plurality of sub-regions;
(c) calculating a first representative pixel value related to a color component for each of a predetermined number of the sub-regions;
(d) identifying as same color regions each of the predetermined number of the sub-regions that have more than a predetermined number of pixels with pixel values within a predetermined range of the first representative pixel value;
(e) calculating a second representative pixel value related to a color component in the same color regions; and
(f) excluding the pixels having pixel values within a predetermined range of the second representative pixel value from the signal region for subsequent determination of the light color of the traffic light.

8. The image processing method according to claim 7, the method further comprising the steps of:
(g) determining the pixel values within the predetermined range of the second representative pixel value to be background color components;
(h) identifying a background region in which the pixels having the background color components are detected within the signal region; and
(i) excluding the background region from the signal region.

9. The image processing method according to claim 7, wherein:
the predetermined number of the sub-regions for which the first representative pixel value is calculated are sub-regions of the signal region in which a background of the traffic light is likely to be captured.

10. The image processing method according to claim 9, wherein:
the first representative pixel value is calculated for each of upper and lower sub-regions of the signal region after rotating the signal region that has been identified so that the traffic light is regarded as being horizontally oriented.

11. A non-transitory computer-readable recording medium having stored therein a program that causes a computer of an image processing apparatus to execute a process that determines a light color of a traffic light from a camera image, the process comprising:
(i) performing image recognition of the camera image to identify a signal region in which the traffic light exists in the camera image;
(ii) dividing the signal region into a plurality of sub-regions;
(iii) calculating a first representative pixel value related to a color component for each of a predetermined number of the sub-regions;
(iv) identifying as same color regions each of the predetermined number of the sub-regions that have more than a predetermined number of pixels with pixel values within a predetermined range of the first representative pixel value;
(v) calculating a second representative pixel value related to a color component in the same color regions; and
(vi) excluding the pixels having pixel values within a predetermined range of the second representative pixel value from the signal region for subsequent determination of the light color of the traffic light.

12. The non-transitory computer-readable recording medium according to claim 11, the process further comprising:
(vii) determining the pixel values within the predetermined range of the second representative pixel value to be background color components;
(viii) identifying a background region in which the pixels having the background color components are detected within the signal region; and
(ix) excluding the background region from the signal region.

13. The non-transitory computer-readable recording medium according to claim 11, wherein:
the predetermined number of the sub-regions for which the first representative pixel value is calculated are sub-regions in which a background of the traffic light is likely to be captured.

14. The non-transitory computer-readable recording medium according to claim 13, wherein:
the first representative pixel value is calculated for each of upper and lower sub-regions of the signal region after rotating the signal region that has been identified so that the traffic light is regarded as being horizontally oriented.

* * * * *